United States Patent
Seigler et al.

(10) Patent No.: US 8,755,254 B2
(45) Date of Patent: Jun. 17, 2014

(54) HEAD GIMBAL ASSEMBLY WITH HEAT ASSIST LASER

(75) Inventors: Michael Allen Seigler, Eden Prairie, MN (US); Edward Charles Gage, Lakeville, MN (US); Bradley Jay Ver Meer, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 131 days.

(21) Appl. No.: 13/158,694

(22) Filed: Jun. 13, 2011

(65) Prior Publication Data

US 2012/0314548 A1   Dec. 13, 2012

(51) Int. Cl.
*G11B 11/00*   (2006.01)

(52) U.S. Cl.
USPC .................................... 369/13.32; 369/13.34

(58) Field of Classification Search
None
See application file for complete search history.

(56) References Cited

U.S. PATENT DOCUMENTS

| | | | |
|---|---|---|---|
| 6,404,706 B1 | 6/2002 | Stovall et al. | |
| 6,996,033 B2 | 2/2006 | Dugas et al. | |
| 8,102,736 B2 * | 1/2012 | Takayama et al. | 369/13.33 |
| 2009/0310459 A1 | 12/2009 | Gage et al. | |
| 2010/0007980 A1 | 1/2010 | Kim et al. | |
| 2010/0118431 A1 | 5/2010 | Tomikawa et al. | |

* cited by examiner

*Primary Examiner* — Paul Huber
(74) *Attorney, Agent, or Firm* — Hall Estill Attorneys at Law

(57) ABSTRACT

An apparatus and associated method for a head gimbal assembly for data transduction in a data storage device with a heat assist laser. Various embodiments of the present invention are generally directed to a slider supporting at least a transducing element on an air bearing surface (ABS) and a laser assembly directly attached to a top side of the slider opposite the ABS. The laser assembly is positioned on the top side with no portion of the laser assembly extending past a longitudinal centerline of the slider.

20 Claims, 5 Drawing Sheets

HEAD GIMBAL ASSEMBLY WITH HEAT ASSIST LASER

SUMMARY

Various embodiments of the present invention are generally directed to a head gimbal assembly for data transduction in a data storage device with a heat assist laser. Various embodiments of the present invention are generally directed to a slider supporting at least a transducing element on an air bearing surface (ABS) and a laser assembly directly attached to a top side of the slider opposite the ABS. The laser assembly is positioned on the top side with no portion of the laser assembly extending past a longitudinal centerline of the slider.

These and other features and advantages which characterize the various embodiments of the present invention can be understood in view of the following detailed discussion and the accompanying drawings.

DETAILED DESCRIPTION

The present disclosure generally relates to the reading and writing of data to a memory space, and in particular to methods and architecture to improve data transfer speed and data storage capacity of a rotatable data media. An ever increasing industry demand for higher data capacity and smaller form factors in data storage devices has been addressed by the inclusion of laser light to heat the data media and allow for more efficient data access. However, laser light generation can require relatively large components to be installed in regions of a data storage device with limited clearances, which results in heighted mechanical interference in high density data applications.

Accordingly, embodiments of the present invention provide a head gimbal assembly (HGA) with a slider coupled to a laser assembly that is positioned on a single longitudinal side of the slider, which allows for data access operations without interference in high data density, reduced form factor data storage devices. The position of the laser assembly on the slider further allows multiple HGAs to be installed adjacent one another, such as between two data media, so to overlap and occupy a common head-to-head spacing without operational interference.

Figure 1:
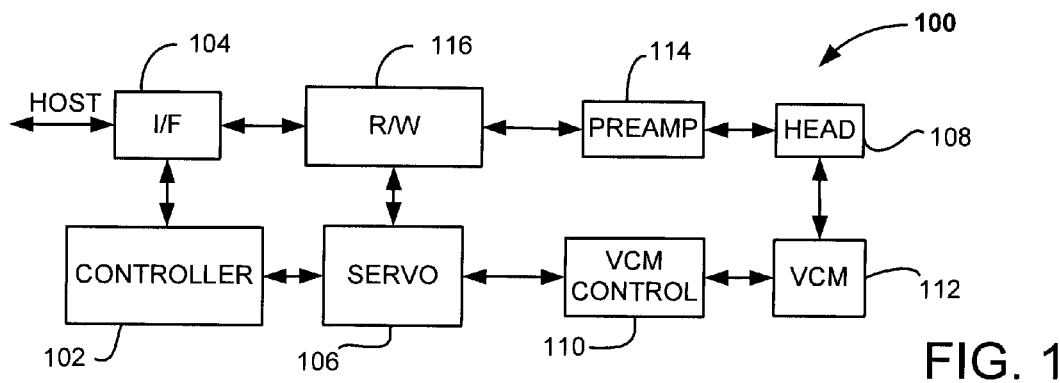
FIG. 1 generally illustrates a block functional diagram of an exemplary control circuitry for a data storage device.

FIG. 1 provides a functional block representation of an exemplary control circuitry 100 capable of managing the operation a data storage device including, without limitation, a heat source and heat source control circuitry. A programmable controller 102 provides top level control for the device 100. The controller 102 interfaces with a host device (not shown) via an interface (I/F) circuit 104. The I/F circuit 104 includes a buffer (not shown) that temporarily stores data during transfers between the host and a recordable medium. A servo circuit 136 uses servo control data transduced from the disk surfaces to provide positional control for the heads 108. The servo circuit 106 supplies current commands to a voice coil motor (VCM) control driver 110 to apply suitable currents to the VCM 112 in order to position the heads 108 to write data to the recordable medium during a write operation through a preamplifier/driver circuit (preamp) 114 that cooperates with a read/write (R/W) channel 116.

Figure 2A:
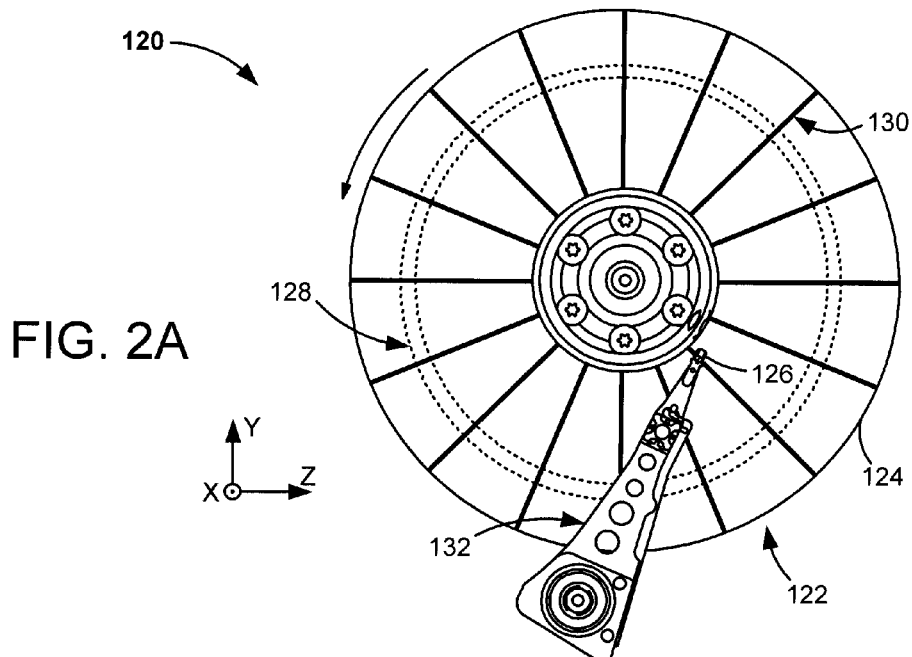
FIGS. 2A and 2B display exemplary portions of the data storage device of FIG. 1.
Figure 2B:
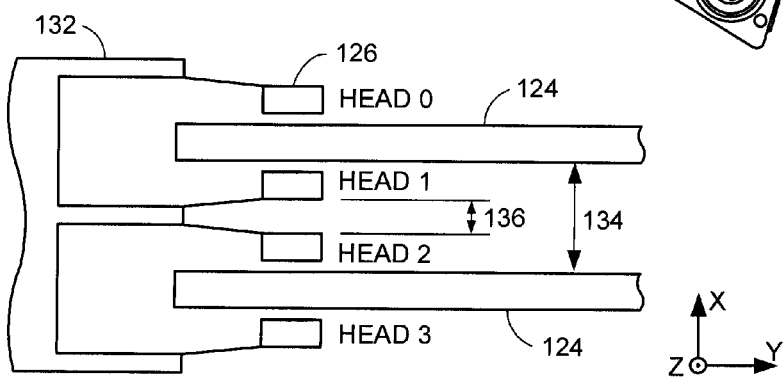

FIGS. 2A and 2B display exemplary portions of a data storage device 120 that is capable of being operated by the control circuitry of FIG. 1. FIG. 2A shows a top view of a head disk stack 122 that has at least one recordable medium 124 over which an HGA 126 travels along data tracks 128 to conduct various data access operations. While moving along the data tracks 128, the HGA 126 encounters servo data written in predetermined servo sections 130, such as wedge and spiral configuration, of the medium 124. A portion of the servo data can be read by a transducing head on the HGA 126 and sent to a controller, such as controller 102 of FIG. 1, to produce a phase locked loop signal that indicates the speed and location of the data bits as well as the HGA 126. The phase locked loop can then be processed by the controller to generate the control signals that provide for the synchronization of the data bits with a laser heat source.

It should be noted that the various tracks, servo wedges, and hardware configurations displayed in FIG. 2A are not required or limited and can be modified as desired. Of further note is the unlimited capacity of the servo data and processing capability of the controller. For example, the timing of the laser pulse information provided by the controller can contain precompensation information, which is a temporal adjustment in the timing of bit placement to compensate for pattern-dependent timing errors in the data.

As shown by the side view of a portion of the data storage device 120 in FIG. 2B, numerous HGAs 126, each including at least one transducing head, can be positioned about several different vertically stacked recordable media 124 and configured to engage multiple data bits simultaneously. In some embodiments, the HGAs 126 are vertically aligned to form a cylinder as similar data tracks of each recordable media 124 are accessed. Such HGA 126 cylinder arrangement can be continually practiced as each HGA 126 is moved by an actuator arm 132 that maintains each HGA 126 alignment regardless of which data track is being accessed. It can be appreciated that in some head disk stacks 122, each actuating arm 130 can support and rotate more than one HGA 126, such as in a disk-to-disk space 134 between data media 124.

With smaller data storage device form factors and increased data bit densities, disk-to-disk and head-to-head spacing 134 and 136 are reduced to precise tolerances. The reduced spacing places a premium on the vertical size of each HGA 126, which consequently affects the minimum allowable disk-to-disk spacing 134. In the event an HGA 126 has an increased vertical height (along the X axis), a recordable medium 124 may have to be removed from the head disk stack 122 in order to conform to a desired form factor due to the vertically aligned configuration of the HGAs 126 that exaggerate any increase in HGA vertical height.

Figure 3:
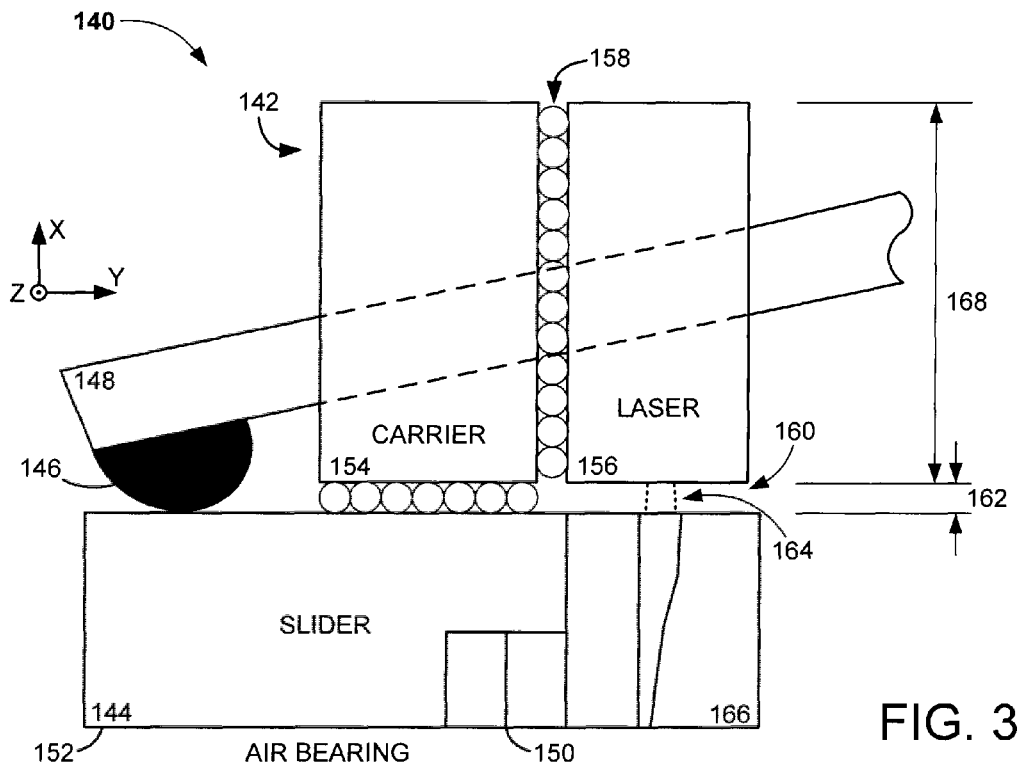
FIG. 3 shows an exemplary data transducer portion of a data storage device constructed and operated in accordance with various embodiments of the present invention.

The issue of HGA vertical height is of particular concern when a laser assembly is being implemented onto one or more HGAs 126. FIG. 3 generally illustrates an HGA portion 140 of a data storage device equipped with a laser assembly 142 mounted directly to a slider 144 that is suspended by a gimbal 146 from a load beam 148. The HGA 140 suspends the slider 144 a predetermined height above a rotating data media, such as media 124 of FIG. 2B, on an air bearing with one or more data transducing heads 150 on an air bearing surface (ABS) 152 of the slider 144 to access data from the adjacent data media.

The laser assembly 142 is directly mounted to the slider 144 with a laser carrier 154 that is coupled to both a laser diode 156 and the slider 144 with an adhesive material 158, such as solder and epoxy. The presence of the adhesive material 158 can add to the size of the laser assembly 142, as shown in FIG. 3, which can provide an air gap 160 with an air gap distance 162 perpendicular to the ABS 152 as the laser diode 154 is cantilevered over a selected portion of the slider 144. In various embodiments of the present invention, the air gap 160 is manipulated to be a predetermined size with an air gap distance 162 that is open or filled to provide enhanced operation through index matching, cooling, and cleaning.

While the carrier 154 and laser diode 156 can be mounted to the slider 144 and oriented in a variety of different non-limiting configurations, the laser light 164 emitted from the laser diode 156 is aligned with a waveguide 166 that maximizes laser coupling efficiency and alignment tolerances to efficiently propagate the laser light 164 and heat a predetermined portion of the adjacent data media and enhance data bit size and transfer speeds of data bit accesses. The cavity length 168 of the laser diode 156 can contribute to the amount of heat generated and the reliability of data accesses. However, an increased cavity length 168 perpendicular to the slider ABS 152, even a length 168 as little as 500 µm, can correspond to interference between adjacent HGAs that can lead to operational issues that can result in unreliable data accesses.

Figure 4:
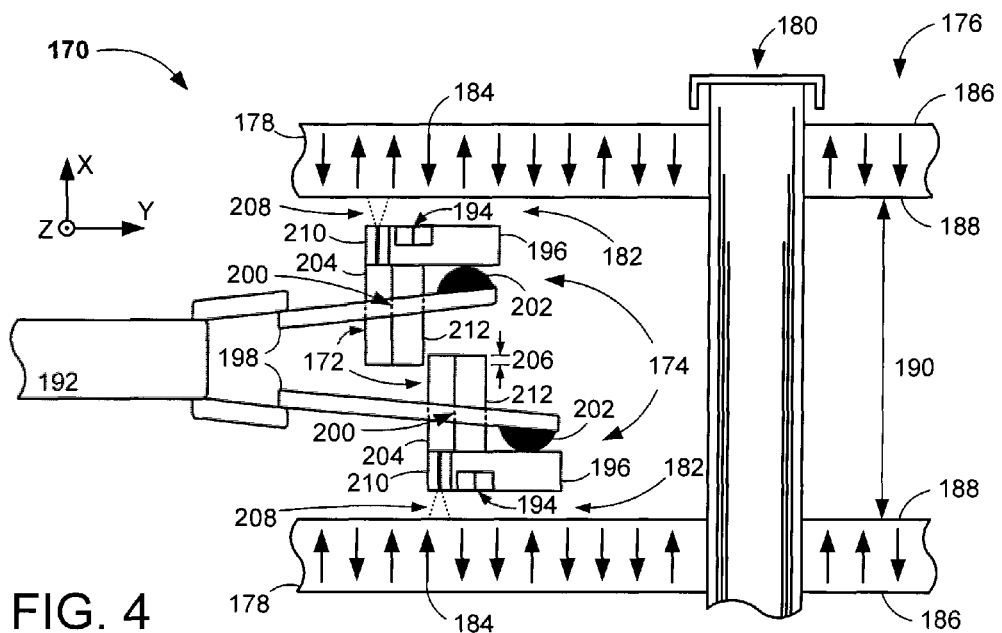
FIG. 4 provides an exemplary portion of the data storage device of FIG. 1.

FIG. 4 displays an actuating portion 170 of an exemplary data storage device where laser assemblies 172 of adjacent HGAs 174 are positioned where mechanical interference can occur without adjustment of the HGAs 174. A disk stack 176 comprised of multiple data media 178 are connected via a spindle 180 that can rotate to create an air bearing 182 that the HGAs 174 use to float above each media 178 to conduct data reading and writing access operations. As shown, each media 178 of the head disk stack 176 can be programmed with data bits 184 that are accessed either from below or above by the HGAs 174. In some embodiments, each media 178 has multiple data bit surfaces, such as both top and bottom data bit storage regions 186 and 188, which can independently be programmed with data to greatly increase the overall data storage capacity of the disk stack 176.

To access the various locations of the data bits 184, the HGAs 174 can be positioned within a disk-to-disk distance 190 that is minimized to allow the most disks to be included in the stack 176 while conforming to small form factors. The HGAs 174 are concurrently connected to and controlled by an actuator arm 192 that aligns data transducing head elements 194 of each slider 196 of each HGA 174 with data bits 184 anywhere on the corresponding media 178. Each slider 196 can be coupled to the actuator arm 192 by a load beam 198 that has an aperture 200 allowing the laser assembly 172 to extend beyond a gimbal 202 point of contact, along the X axis, between the slider 194 and the load beam 198.

Despite the load beam aperture 200, any increase in vertical height, as measured perpendicular to the disk surfaces 186 and 188 along the X axis, of a laser diode 204 of a laser assembly 172 has a compounding effect when both HGAs 174 occupy the same overlap distance 206 in between the load beams 198. As such, mechanical interference in the overlap distance 206 can produce inadvertent load beam deflection as well as slider 196 and laser diode 204 misalignments. The various misalignments can correspond with data accessing errors as laser light 208 emitted from the waveguide 210 lacks strength and/or precision. In addition, such mechanical interference can result in a laser diode 204 separating from the laser carrier 212 and traumatically contacting various components of the actuating portion 170.

In an example embodiment that alleviates mechanical interference when the laser assemblies 172 each occupy the overlap distance 206, either load beam 198 is extended downtrack, along the Y axis, so that the laser assemblies 174 are laterally separated and offset while the HGAs 174 are inverted in the same disk-to-disk space 190 to access different data media 178. Such a downtrack configuration of the load beams 198, HGAs 174, and laser assemblies 172 allows the laser assemblies 172 to be positioned on the same region of the sliders 196 without inducing mechanical interference when the HGAs 174 are inverted and positioned in a common disk-to-disk space 190.

From FIG. 4, it can appreciated that the potential consequences of laser diode 204 operations with increased laser cavity length, as discussed in FIG. 3, can produce unwanted and detrimental operational characteristics in high density, small form factor applications regardless of utilization of a common head-to-head space 206 to extend the laser diode 204. Accordingly, the laser assembly 172 can be located in various positions on the slider 196 to allow the HGAs 174 to separately occupy the common overlap distance 206 with increased laser diode cavities while eliminating mechanical interference.

Figure 5:
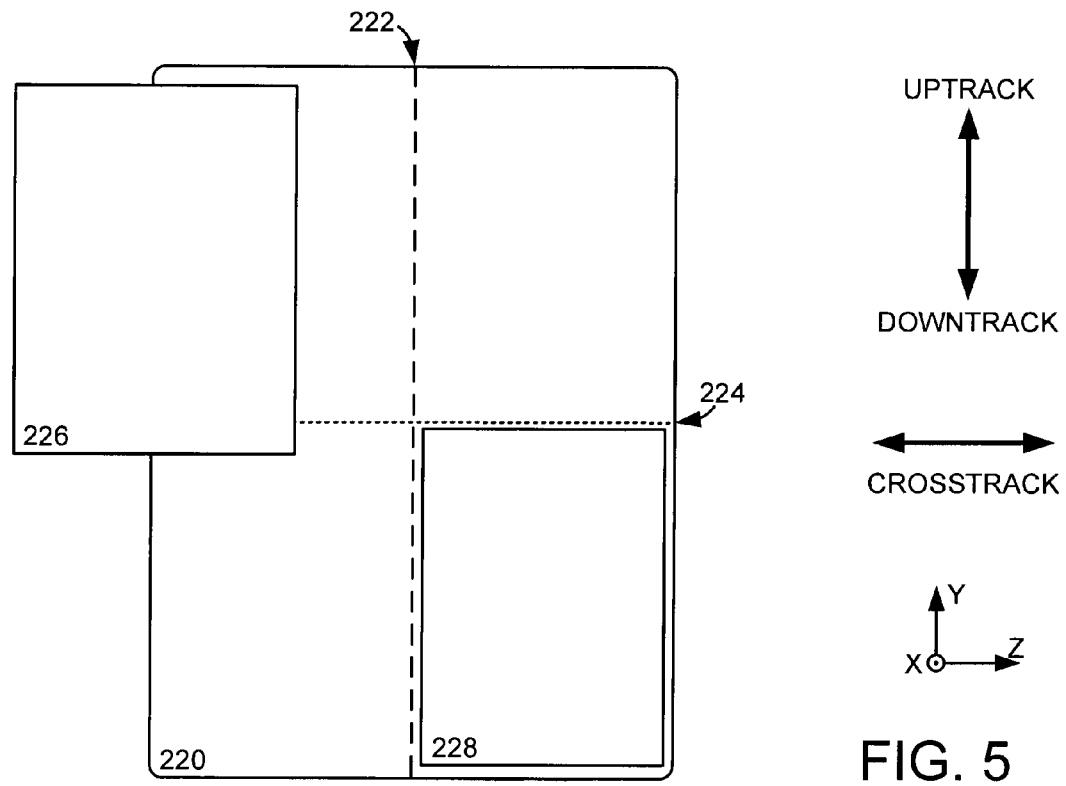
FIG. 5 illustrates a top view of an exemplary slider with various laser assembly mounting locations.

FIG. 5 generally shows a top view of a variety of laser assembly mounting configurations on a slider 220 that each allow multiple HGAs to fit in a common head-to-head space without interfering with one another. It should be noted that FIG. 5 provides a simplified top view of the slider 220 with a rectangular shape in which the uptrack and downtrack (Y axis) length is longer than the crosstrack (X axis) length, but such slider 220 shape is not required as any dimensions can be used, as desired. When the slider 220 has one dimension that is longer than the other, a longitudinal axis 222 and a transverse axis 224 dissect the slider respectively along the X and Y axes, as shown. The longitudinal and transverse axes 222 and 224 provide fiducials that allow for accurate and reliable placement of a laser assembly on the slider 220.

As discussed above, centering a laser assembly on the slider 220 can result in mechanical and operational interference as laser assemblies attempt to occupy the same portion of head-to-head space. To remedy such interference, an offset laser assembly 226 is mounted on the top surface (opposite the ABS) of the slider 220 with no part of the offset assembly 226 extending past the longitudinal centerline axis 222. That is, the offset laser assembly 226 including the laser diode and carrier are directly connected to the slider 220 so that no part of the assembly 226 crosses the longitudinal axis 222.

While the offset laser assembly 226 is positioned on a particular side of the slider 220, such orientation does not restrict the possible laser assembly configurations and positions within a selected portion of the slider 220. As displayed, the offset laser assembly 226 extends past the transverse centerline axis 224, which can advantageously allow for a variety of laser assembly shapes and sizes. In some embodiments, the offset laser assembly 226 overhangs a portion of the dimensional boundary of the slider 220, which can provide additional mounting space and locations on the side of the slider 220, along the X axis.

Other embodiments position a quadrant laser assembly 228 completely within a single quadrant defined by the longitudinal and transverse centerline axes 222 and 224 as well as the dimensional boundary of the slider 220. The downtrack/uptrack mounting location, isolated on either side of the transverse centerline axis 224, of the quadrant laser assembly 228 can facilitate the placement of multiple components on the top surface of the slider 220 and allow for inverted HGAs to concurrently occupy a common head-to-head space without interference.

These various laser assembly mounting locations can be characterized as along the slider 220 (uptrack, downtrack) and across the slider 220 (crosstrack) to denote the position of the assemblies with respect to a corresponding data track on an adjacent data media, such as media 178 of FIG. 4. The chosen laser assembly mounting position on the top surface of the slider 220 can further be used, without limitation, to mount a data transducing means, such as a read and write head, on the ABS of the slider 220 in various mounting locations to access predetermined portions of an adjacent data media.

Figure 6:
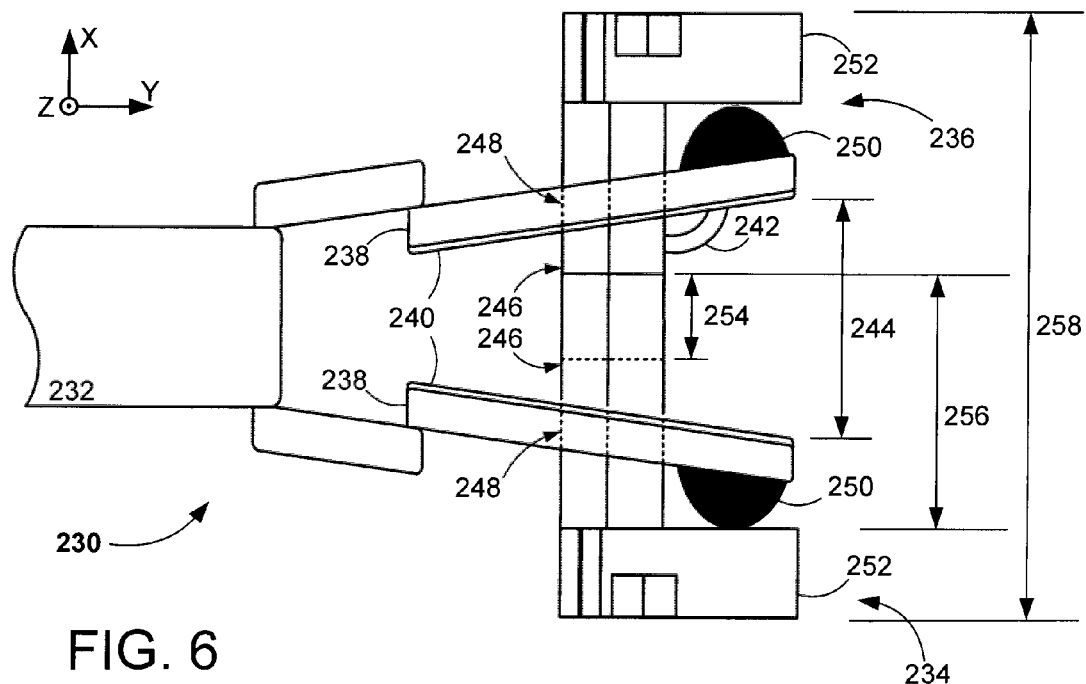
FIG. 6 shows a side view of exemplary portions of the data storage device of FIG. 1 as constructed and operated in accordance with various embodiments of the present invention.

By positioning the laser assemblies 226 and 228 biased to on a selected side of one or both centerline axes 222 and 224 of the slider 220, inverted HGAs can occupy a head-to-head space with increased laser diode cavity length and without mechanical interference. FIG. 6 generally illustrates a data transducing portion 230 of an exemplary data storage device that utilizes the laser assembly mounting orientations discussed in FIG. 5. An actuator arm 232 supports inverted first and second HGAs 234 and 236 that are each suspended by a load arm 238 and connect to a flex-on suspension (FOS) 240 via interconnects 242, such as wires and bond pads. The load beams 238 define a head-to-head space 244 that are occupied by laser assemblies 246 of each HGA 234 and 236 that extend through apertures 248 in each load beam 238 and FOS 240.

Each HGA 234 and 236 is allowed to pitch and roll along an air bearing through attachment with a gimbal 250. The inclusion of the laser assembly 246 to the gimbaled slider 252 can be compensated for by various unlimited techniques that provide balanced movement and operation. Such balanced operation is further facilitated by offsetting the laser assemblies on the same longitudinal side of the slider 252, which allows the assemblies 246 to have an overlap region 254 where each laser assembly 246 occupies the same vertical portion of the head-to-head space 244, along the X axis, but are separated along the Z axis so that the laser assemblies 246 can adjust and move without mechanical interference.

In some embodiments, the laser assemblies 246 are offset along the downtrack direction, along the Y axis, with each assembly 246 isolated to a selected side of a transverse axis to occupy the same vertical position in the head-to-head space 244 and the same overlap region 254 when viewed from the Y axis. With a downtrack laser assembly offset configuration, a gimbal 250 and waveguide 259 can be modified to provide simultaneous access to similar regions of adjacent data storage media.

The ability to overlap the laser assemblies 246 with an offset mounting position on the sliders 252 allow for a longer laser cavity length 256 that can provide enhanced heating and data access operations. The laser assembly overlap 254 further allows for a minimal ABS-to-ABS distance 258 that is necessary to provide the maximum number of data recording media with a given form factor. While the offset positions of the laser assemblies 246 can be identical in both HGAs 234 and 236, such configuration is not required to produce the overlap region 254 as the assemblies 246 can vary with respect to crosstrack, uptrack, and downtrack directions, as desired.

Figure 7:
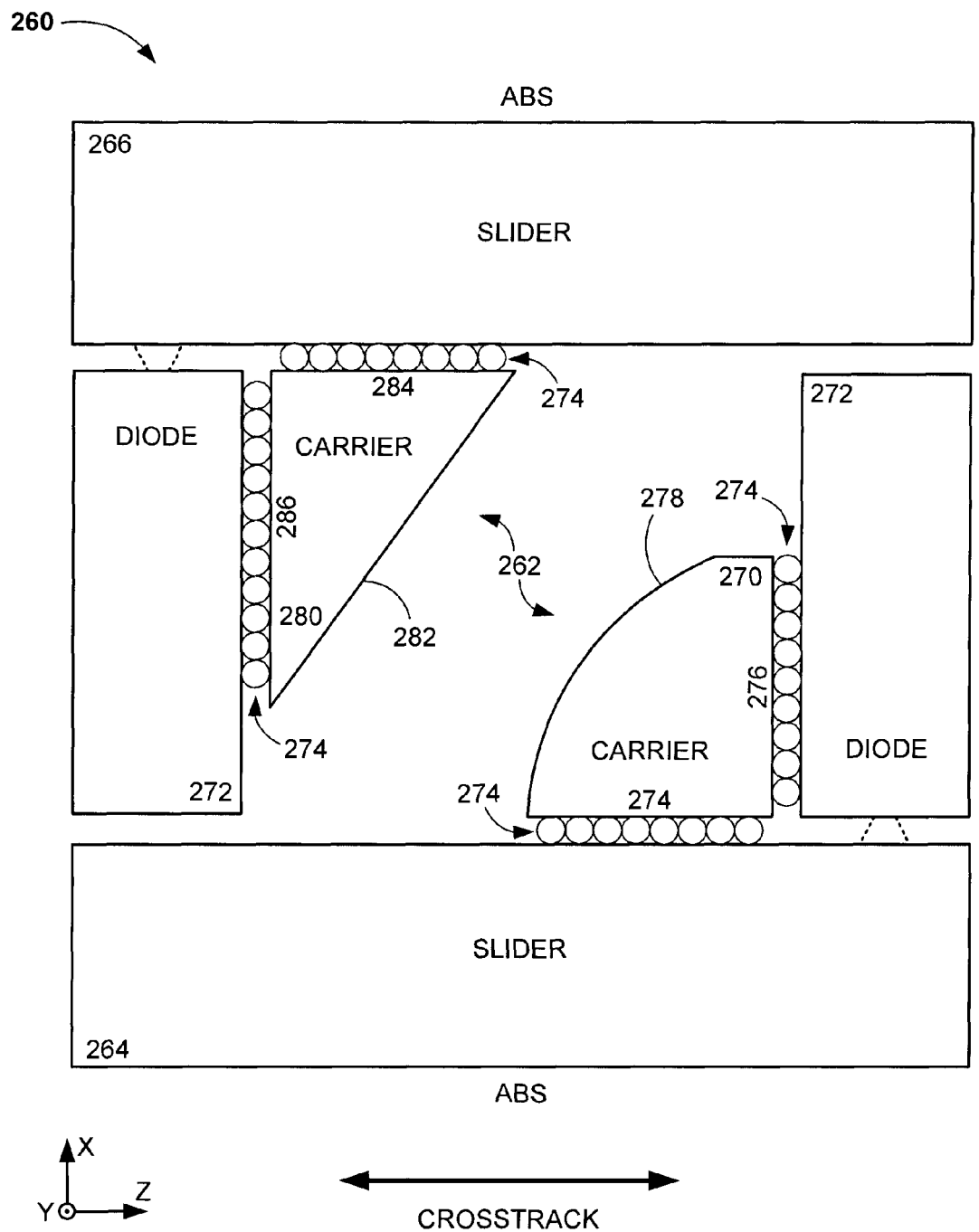
FIG. 7 shows a top view of exemplary portions of the data storage device of FIG. 1 as constructed and operated in accordance with various embodiments of the present invention.

FIG. 7 shows a side view of an exemplary data transducing portion 260 of a data transducing device as constructed in accordance with various embodiments of the present invention. The data transducing portion 260 includes laser assemblies 262 mounted to selected regions of a first and second slider 264 and 266, respectively. The laser assemblies 262 are configured in offset positions on each slider 264 and 266 to allow the laser assemblies 262 to overlap along the X axis when inverted and occupy the vertical distance of a single laser assembly.

The laser assemblies 262 can be individually or collectively configured with various laser carrier 268 shapes and sizes that provide additional laser assembly separation to prevent mechanical and operation interference as the sliders 264 and 266 are concurrently moved to conduct data accesses. As displayed, a first laser carrier 270 is attached to a laser diode 272 along alignment surfaces 274 and 276 with adhesive material 274 that maintains the diodes alignment with the first slider 264. The first carrier 270 has a continuously curvilinear rear surface 278 and a vertical height, along the X axis, that is less than the length of the laser diode 272, which packages the laser assembly 262 in a reduced space while adding less weight to the gimbaled first slider than if the first carrier 270 was as large as the laser diode 272.

In another embodiment displayed by a second laser carrier 280 mounted on the second slider 266, a continuously tapered non-normal rear surface 282 connects the alignment surfaces 284 and 286 and provides a reduced carrier profile while securing the laser diode 272 in a predetermined location in relation to the second slider 266. With the minimal size of the first and second laser carriers 270 and 280, the laser diodes 272 can have increased size and a wider range of mounting locations on a selected longitudinal side of the sliders 264 and 266, respectively, without concern for interference during operation.

In yet another example embodiment, the laser carrier extends beyond one or both longitudinal and transverse axes of the sliders to provide more mounting locations and space for the laser diode 272. Such an embodiment can include larger laser diodes 272 and matching laser carrier rear surfaces to maximize the common space between the inverted sliders 264 and 266 without inducing mechanical interference during operation.

It should be noted that the laser carrier mounting positions shown in FIG. 7 are not limited and can be modified individually or collectively, as desired. For example, the laser carriers 270 and 280 can mount to the external side of the sliders 264 and 266 instead of exclusively being coupled to the top surface of each slider 264 and 266, as displayed. The unlimited range of laser carrier shapes and mounting locations on a selected longitudinal side of a slider can provide advantageous manufacturing options that accommodate a number of different operational environments, such as reduced form factors and increased laser diode cavities.

Figure 8:
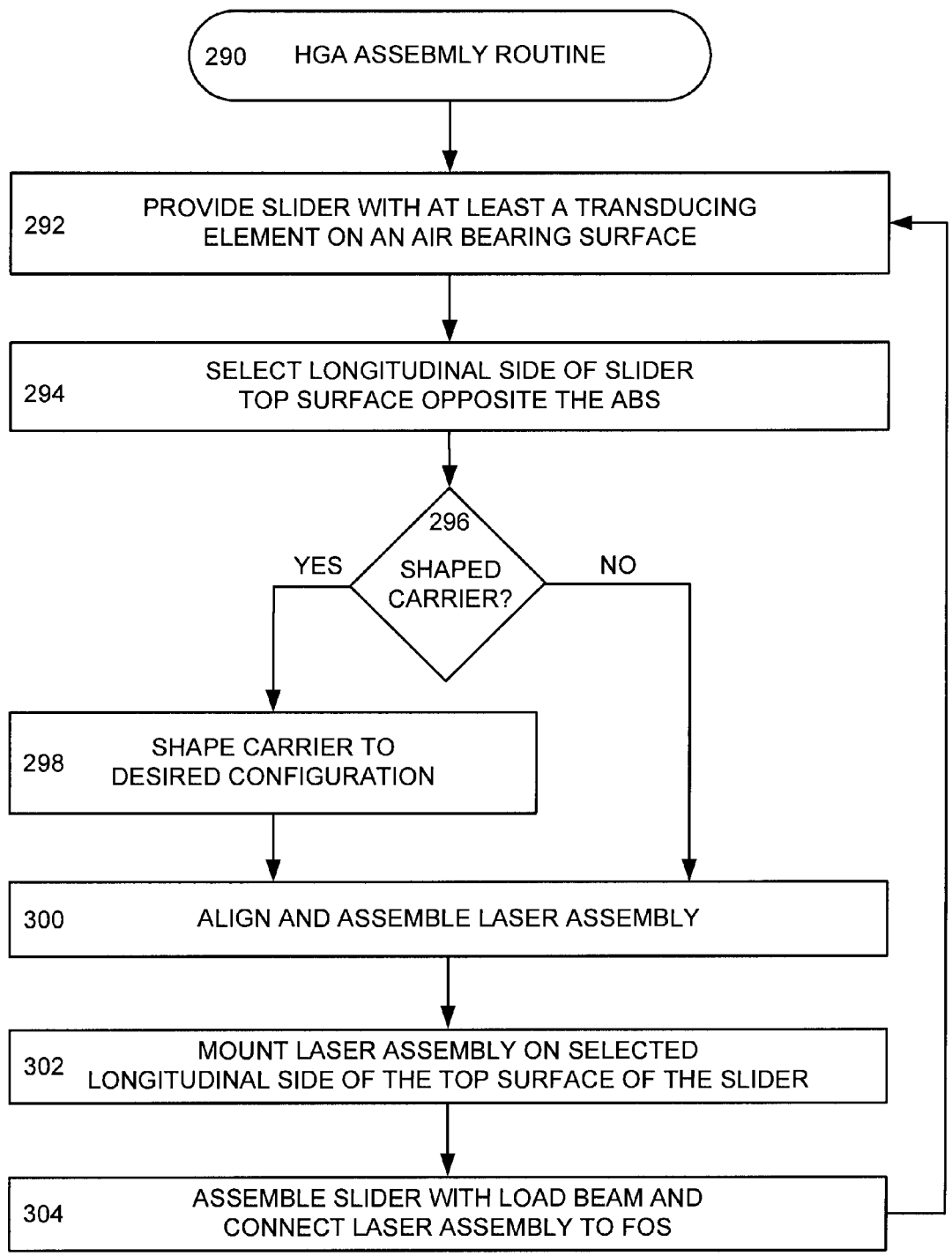
FIG. 8 provides a flowchart of an exemplary head gimbal assembly routine carried out in accordance with various embodiments of the present invention.

FIG. 8 provides a HGA assembly routine 290 conducted in accordance with various embodiments of the present invention. The routine 290 begins by providing a slider with at least a data transducing element on an air bearing surface (ABS) in step 292. A longitudinal side of the top surface of the slider is then selected in step 294, which determines what portion of the top surface opposite the ABS and the transducing element provided in step 292 is desired. No longitudinal side of the top surface of the slider is preferred as various factors, such as laser assembly size and data access performance requirements, can indicate the use of one longitudinal side over the other.

In decision 296, the shape of a laser carrier is evaluated to determine if various rear surface features, such as the rear surface and size configurations shown in FIG. 7, or a standard size and shape carrier, as shown in FIG. 3, is desired. A conclusion that a shaped carrier is wanted leads to step 298 where a laser carrier is configured to a predetermined size and shape. With the laser carrier shaped in step 298 or a determination that no alteration of the standard carrier configuration is desired, the routine 290 advances to step 300 where the laser carrier is aligned and assembled into a laser assembly with a laser diode. Assembly of the laser assembly is not restricted to a particular coupling means as any connecting material, such as solder or adhesive, can be used independently or in combination to affix the laser assembly together.

The laser assembly is subsequently mounted on the selected longitudinal side of the slider in step 302. It should be noted that alignment of the laser carrier and diode in step 300 as well as the alignment of the laser assembly to the top surface slider in step 302 can be done in a number of different non-limiting manners. For example, a feedback mechanism such as monitored optical coupling and imaged fiducials can be used during alignment independently or in combination with physical alignment of the components in a template, such as a flat or cornered surface.

The mounted laser assembly and slider are then assembled with a load beam to provide suspension for the slider to ride an air bearing a predetermined height above an adjacent data storage media, as discussed above. The load beam may have one or more apertures that allow the laser assembly to extend past the load beam perpendicular to the ABS of the slider. The load beam may further connect to the slider with a gimbal, such as gimbal 250 of FIG. 6, which allows the slider to pitch and roll along the air bearing during operation.

In step 304, the laser assembly is electrically connected to a FOS to provide control and feedback of laser diode operation. The means of connecting the laser assembly to the FOS, as well as the location of the FOS in relation to the load beam and slider, are not limited. In some embodiments, the laser assembly connects to the FOS via slider as the laser diode has electrical pads that connect to the laser carrier which connects to the slider that is coupled to the FOS. Other embodiments use wire or ball bonds to directly connect the laser diode with the FOS. Regardless of the connection means between the laser assembly and FOS, the laser diode can be operated independently or in combination with operation of the slider and data transducing element.

With an HGA assembled with operational suspension and electrical connections, the routine 290 can terminate or begin again with a separate slider and transducing element in step 292. A second assembled HGA, in some embodiments, can be inverted, attached to a single actuator arm, and placed between two data storage media in a disk stack, such as stack 176 of FIG. 4. The inverted orientation of the HGAs and single longitudinal side laser assembly mounting allows for the laser assemblies to overlap in a common head-to-head space, as generally displayed in FIGS. 6 and 7, to provide a minimal ABS-to-ABS distance conducive to reduced form factor data storage devices.

Through the routine 290, one or more HGAs are assembled with increased data accessing capabilities due to the enhanced laser diode cavity length. However, the various steps of routine 290 are not required or limited as any of the decisions and steps can be omitted, changed, and added. For example, selection of a longitudinal side of the slider in step 294 can be done in conjunction with the mounting of the laser assembly in step 302. Additionally, the assembly and inclusion of a second HGA assembly with a first HGA between data media in a disk stack can be one or more supplemental steps.

It can be appreciated that the assembly and configuration of the HGA provides beneficial operational characteristics in the form of improved space management in reduced form factor data storage devices. Such space management allows a laser diode to be mounted directly on the slider with an increased laser cavity for enhanced performance without inducing mechanical interference or adding distance between ABS surfaces of adjacent HGAs in a disk stack. It will be appreciated that the claimed subject matter can readily be utilized in any number of other applications, including non-data storage device applications.

It is to be understood that even though numerous characteristics and advantages of various embodiments of the present invention have been set forth in the foregoing description, together with details of the structure and function of various embodiments, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A data storage device comprising a first and second slider each supporting at least a transducing element respectively on a first and second air bearing surface (ABS), first and second laser assemblies directly attached respectively to first and second top sides of the first and second sliders opposite each ABS, the first and second laser assemblies configured to occupy a common overlap distance between the first and second sliders without mechanical interference.

2. The data storage device of claim 1, wherein the first and second sliders are inverted with respect to one another in a common disk-to-disk space.

3. The data storage device of claim 1, wherein the first and second sliders are respectively attached to first and second load beams, the first load beam extending beyond the second load beam to allow the first and second laser assemblies to occupy the common overlap distance.

4. The data storage device of claim 1, wherein the first and second laser assemblies are offset in a crosstrack direction so the overlap distance is along a crosstrack plane.

5. The data storage device of claim 1, wherein the first and second laser assemblies are offset in a downtrack direction so the overlap distance is along a downtrack plane.

6. An apparatus comprising:
   a first slider supporting at least a transducing element on a first air bearing surface (ABS); and
   a first laser assembly directly attached to a first top side of the first slider opposite the ABS, the first laser assembly positioned on the first top side with no portion of the first laser assembly extending past a first longitudinal centerline of the first slider, the first longitudinal centerline bisecting the first slider and aligned along a downtrack direction of the first slider.

7. The apparatus of claim 6, wherein the first laser assembly comprises a laser diode coupled to a laser carrier.

8. The apparatus of claim 7, wherein the laser carrier is mounted on the first slider and the laser diode is cantilevered over a selected portion of the slider.

9. The apparatus of claim 8, wherein the selected portion of the first slider is a waveguide.

10. The apparatus of claim 8, wherein the laser diode is separated from the first slider by a predetermined air gap distance.

11. The apparatus of claim 7, wherein the laser carrier has a first and second alignment surface and a rear surface feature that connects the first and second alignment surfaces.

12. The apparatus of claim 11, wherein the rear surface feature of the laser carrier is a continuously curvilinear surface.

13. The apparatus of claim 11, wherein the rear surface feature of the laser carrier is a continuously tapered non-normal surface.

14. The apparatus of claim 6, wherein an actuator arm supports a first and second load beam that respectively suspends first and second sliders supporting at least a transducing element on first and second air bearing surfaces (ABS), a second laser assembly directly attached to a second top side of the second slider opposite the second ABS with no portion of the second laser assembly extending past a second longitudinal centerline of the second slider.

15. The apparatus of claim 14, wherein the first slider is inverted with respect to the second slider so that the first and second laser assemblies overlap along a vertical axis and are separated along a horizontal axis.

16. The apparatus of claim 14, wherein the first and second load beams each have an aperture that allows the first and second laser assemblies to respectively extend into a common head-to-head space.

17. The apparatus of claim 14, wherein the first and second laser assemblies are positioned on a same longitudinal side of the first and second centerlines.

18. A method comprising:
providing a first slider supporting at least a first transducing element on a first air bearing surface (ABS), the first slider having a width and a length measured perpendicular to the width, the length being greater than the width; and
mounting a first laser assembly directly to a first top side of the first slider opposite the first ABS, the first laser assembly positioned on the first top side with no portion of the first laser assembly extending past a first longitudinal centerline of the first slider, the first longitudinal centerline bisecting the slider and aligned parallel to the length of the first slider.

19. The method of claim 18, further comprising attaching the first slider to a first load beam that is suspended by an actuator arm, the actuator arm concurrently suspending a second slider through a second load beam, the second slider having at least a second transducing element on a second air bearing surface (ABS) and mounting a second laser assembly directly to a second top side of the second slider opposite the second ABS, the second laser assembly positioned on the second top side with no portion of the second laser assembly extending past a second longitudinal centerline of the second slider.

20. The method of claim 19, wherein the first and second sliders are inverted in a common disk-to-disk space between a first and second recordable data media of a data disk stack, the actuator arm simultaneously rotates the first and second sliders to access similar regions of the first and second recordable data media.

* * * * *